United States Patent [19]
Nakabayashi

[11] Patent Number: 5,808,785
[45] Date of Patent: Sep. 15, 1998

[54] OPTICAL FIBER AMPLIFIER AND OPTICAL TRANSMISSION SYSTEM USING THE SAME

[75] Inventor: Yukinobu Nakabayashi, Tokyo, Japan

[73] Assignee: NEC Corporation, Tokyo, Japan

[21] Appl. No.: 746,778

[22] Filed: Nov. 15, 1996

Related U.S. Application Data

[62] Division of Ser. No. 364,456, Dec. 27, 1994, Pat. No. 5,600,481.

[30] Foreign Application Priority Data

Dec. 27, 1993 [JP] Japan .................................. 5-330275

[51] Int. Cl.$^6$ .......................... H04B 10/16; H01S 3/131; G02F 1/39
[52] U.S. Cl. .......................... 359/341; 359/337; 359/343
[58] Field of Search .................................. 359/160, 177, 359/187, 337, 341, 343

[56] References Cited

U.S. PATENT DOCUMENTS

| | | | |
|---|---|---|---|
| 5,117,196 | 5/1992 | Epworth et al. | 359/333 |
| 5,128,801 | 7/1992 | Jansen et al. . | |
| 5,245,690 | 9/1993 | Aide et al. | 385/142 |
| 5,268,786 | 12/1993 | Matsushita e tal. . | |
| 5,374,973 | 12/1994 | Maxham et al. . | |
| 5,471,334 | 11/1995 | Masuda et al. | 359/177 |
| 5,483,233 | 1/1996 | Pettett et al. | 359/341 |

FOREIGN PATENT DOCUMENTS

| | | |
|---|---|---|
| 3-89644 | 4/1991 | Japan . |
| 4165334 | 6/1992 | Japan . |
| 2244595 | 12/1991 | United Kingdom . |

OTHER PUBLICATIONS

Aeda et al., NTT Trans. Sys. Lab., Trans. Inst. Electron. Inf. Consumer Eng. B–I (Japan), vl. J75B–I, #5, pp. 298–303, May 1992.

K. Hagimoto, et al., "A 212 km Non–repeated Transmission Experiment at 1.8 Gb/s using LD Pumped $Er^{3+}$–Doped Fibe Amplifiers in an IM/Direct–Detection Repeater System," PD15 1–4 of OFC '89 pp. 75–82 of O plus E No. 113.

K. Nakagawa, et al., "Trunk and Distribution Network Application of Erbium–Doped Fiber Amplifier", Journal of Lightwave Technology, vol. 9, No. 2, Feb. 1991, pp 198–208.

H. Toba, et al., "A 100–Channel Optical FDM Six–Stage In–Line Amplifier System Employing Tunable Gain Equalizers," IEEE Photonics Technology Letters, vol. 5, No. 2, Feb. 1993, pp. 248–251.

K. Kikushima, "Using Equalizers to Offset the Deterioration in SCM Video Transmission due to Fiber Dispersion and EDFA Gain Tilt," NTT Transmission Systems Laboratories, pp. 4–98 (1992).

E. Desurvire, et al., "Amplification of Spontaneous Emission in Erbium–Doped Single–Mode Fibers," Journal of Lightwave Technology, vol. 7, No. 5, May 1989.

*Primary Examiner*—Nelson Moskowitz
*Attorney, Agent, or Firm*—Sughrue, Mion, Zinn, Macpeak & Seas, PLLC

[57] ABSTRACT

A rare earth-doped optical fiber is supplied with a input signal light and an excitation light, so that the input signal light is amplified to be supplied to an output as an amplified signal light. At this time, an intensity of an amplification of spontaneous emission (ASE) is detected to be compared with a predetermined intensity, thereby to provide a difference signal. An amount of the excitation light is controlled by the difference signal to equalize the ASE to the predetermined intensity.

3 Claims, 16 Drawing Sheets

OPTICAL FIBER AMPLIFIER AND OPTICAL TRANSMISSION SYSTEM USING THE SAME

This is a divisional of application No. Ser. No. 08/364,456 filed Dec. 27, 1994, now U.S Pat. No. 5,600,481.

FIELD OF THE INVENTION

The invention relates to an optical fiber amplifier and an optical transmission system using the same, and, more particularly, to an optical fiber amplifier eliminating the dependency of gain on wavelength, and an optical transmission system using the same.

BACKGROUND OF THE INVENTION

An optical fiber amplifier using an Erbium-doped fiber amplifier (EDFA) has a high saturation output, a high gain, and non-polarization dependency.

For these properties, such an EDFA is used for an optical booster amplifier, an optical repeater, an optical pre-amplifier, etc. Consequently, the freedom for optical communication systems is remarkably expanded. Optical communication systems in which such EDFAs are used have been described in reports entitled "A 212 km non-repeated transmission experiment at 1.8 Gb/s using LD pumped $ER^{3+}$-doped fiber amplifier in an IM/direct-detection repeater system" presented at OFC'89, PD-1, Jan. 1989 by Hashimoto, et al, "Impact applied on optical communication systems by Er-doped fiber optical amplifiers" presented at O plus E, 113, April, 1989 by Shimada, and "Trunk and distribution network application of Erbium-doped fiber amplifier" presented at IEEE, Journal of Lightwave Technology, Vol. 9, No. 2, Feb. 1991 by Nakagawa, et al.

Further, optical communication systems in which wavelength multiplexing light signal transmission is adopted, or fiber type Mach-Zender gain equalizers are used has been described in a report entitled "A 100-channel optical FDM six-stage in-line amplifier system employing tunable gain equalizers" presented at IEEE, Photonixs Tech. Lett. Vol. 5, No. 2, Feb. 1993 by Toba, et al.

In the optical communication system using the EDFAs, however, there is a disadvantage in that the deterioration of a light signal at wavelengths having low gains is large due to the dependency of signal lights on wavelengths in the EDFAS, when the wavelength multiplexing communication system is used. In order to overcome the disadvantage, a system in which a signal wavelength band of each signal light is set proportionally to a gain of each wavelength band in accordance with a gain-to-band property of an optical amplifier as has been proposed in the Japanese Patent Kokai No. 3-89644.

In a system using the Mach-Zender gain equalizer, there are disadvantages in that accumulated gain differences are difficult to compensated for in carrying out step-by-step amplification, and the fabrication cost of the equalizer is high. In using a fiber type Mach-Zender gain controller, there is a disadvantage in that a control response speed is not satisfactory, because a wavelength property of a transmission factor is controlled by a fiber temperature. Even in analog signal light transmission, composite secondary distortion occurs to induce deterioration of transmission signals due to the dependency of a gain in an EDFA on a signal light wavelength. For this disadvantage, a proposal in which a gain is corrected by using a band-pass filter having a tuning wavelength slightly deviated from a wavelength of a signal light has been described in a report of B-705 in the Institute of Electronics Information and Communications Engineerings, 1992 by Kikushima. However, the proposal cannot be applied to a system for transmitting signal lights of multiple-wavelength.

SUMMARY OF THE INVENTION

Accordingly, it is an object of the invention to provide an optical fiber amplifier and an optical transmission system using the same, in which a gain is appropriately corrected.

It is a further object of the invention to provide an optical fiber amplifier, and an optical transmission system using the same, in which a predetermined dependency of a gain on a wavelength is maintained, even if an intensity of an input signal light is fluctuated.

According to the first feature of the invention, an optical fiber amplifier, comprises:

a core doped with a predetermined concentration of an amplifying active element; and a cladding layer covering the core to provide an amplifying optical fiber;

wherein a length of the amplifying optical fiber is set to provide a minimum dependency of a gain on a wavelength of a signal light.

According to the second feature of the invention, an optical transmission system using an optical fiber amplifier, comprises:

a light source for emitting plural signal lights of different wavelengths;

an optical modulator for modulating the plural signal light to provide plural modulated signal lights;

an optical coupler for coupling the plural modulated signal lights to provide a transmission signal light;

one or more amplifying optical fibers supplied with the transmission signal light and an excitation light; wherein:

the control unit controls the amount in accordance with an amplification of spontaneous emission expressing the gain.

BRIEF DESCRIPTION OF THE DRAWINGS

The invention will be explained in more detail in conjunction with appended drawings, wherein.

DESCRIPTION OF THE PREFERRED EMBODIMENTS

Before explaining an optical fiber amplifier and an optical transmission system using the same in the preferred embodiments according to the invention, the principle of the invention will be explained.

The invention was made by analyzing amplification operation in an amplifying optical fiber of an optical amplifier for amplifying an input light in accordance with the excitation of the amplifying optical fiber by a light emitted in an excitation light source. Hereinafter, one example in which an Erbium-doped optical fiber (which is generally used at a wavelength band of 1.55 µm) is used will be explained in detail.

The principle discussed here can be applied to cases where a neodium-doped optical fiber amplifier, a placeodimium-doped optical fiber amplifier, etc. which are used at a wavelength band of 1.3 µm are used.

The dependency of a gain on a wavelength in an Erbium-doped optical fiber is determined by the dependency of an amplification power of Erbium on a wavelength, that is, a scattering cross-section and mode competition among signal lights of different wavelengths.

Figure 1:
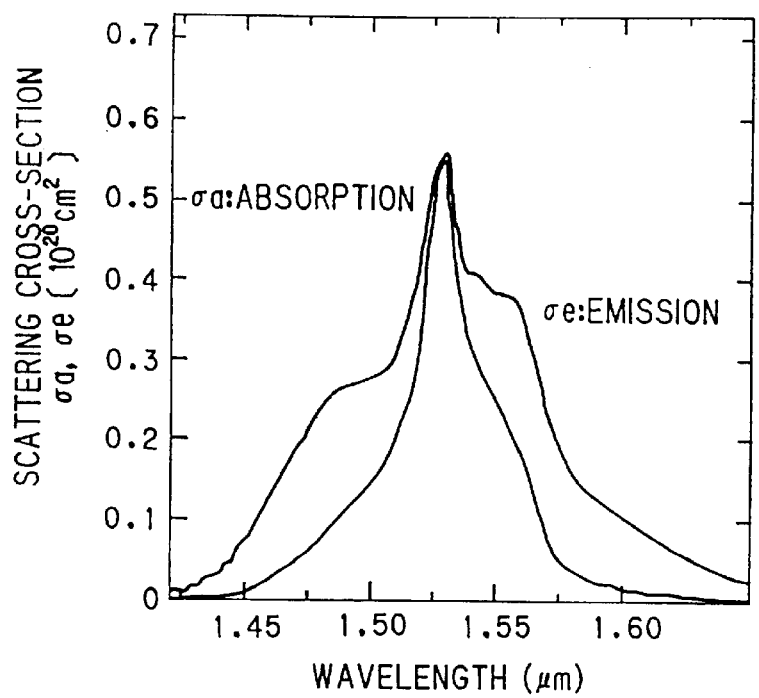
FIG. 1 is a graph explaining scattering cross-section of Erbium ions relative to wavelength.

FIG. 1 shows a scattering cross-section of Er-ions, wherein δa is an absorption scattering cross-section, an δe is an emission scattering cross-section. In general, the wavelength-dependency is lower in a long wavelength to indicate the decrease at right hand in the vicinity of a wavelength of 1.55 µm which is used for optical communication. Where a fiber is sufficiently short, the wavelength-dependency of a gain decreases in the right direction. On the other hand, where a fiber is sufficiently long, energy shifts from a signal light of a short wavelength having a high energy per photon to a signal light of a long wavelength having a low energy per photon. This is the same as phenomenon in which energy shifts from an excitation light having a high energy per photon to a signal light having a low energy per photon, so that the signal light is amplified by the shifted energy. The reason why such mode competition tends to occur, where a fiber is sufficiently long, is that the influence of the excitation light on the signal light is weakened, because the energy of the excitation light is consumed, and an intensity of the signal light is increased by amplification thereof.

For this reason, the wavelength-dependency of a gain in an EDFA depends on a length of the optical fiber. The change of the fiber length as explained here is inherently identical to the change in number of atoms in amplification active seeds of the amplifying fiber, so that a concentration of the amplification active seeds can be changed in the amplifying. fiber to result in the same phenomenon.

In the invention, a length of an amplifying fiber is set to be optimized to provide a predetermined wavelength-dependency of a gain, when a gain which is required for an optical amplifier is to be achieved. Alternatively, a concentration of amplifying active elements in an amplifying optical fiber is set to be optimized. That is, an amplifying optical fiber is cut to decrease its length or connected with an additional optical fiber to increase its length, thereby providing a predetermined gain and a predetermined wavelength-dependency by introducing a signal light and an excitation light into the length-adjusted amplifying optical fiber. Further, an optimum fiber length may be determined in accordance simulation in which amplification course held in an amplifying optical fiber is simulated by using a rate equation in a simulator. As presented at IEEE, Journal of lightwave technology, Vol. 7, No. 5, May 1989 by Emmanuel Desurvier, et al, it is carried out that an amplification equation in an amplifying optical fiber is solved by an element of a rate equation for determining state of amplifying active seeds. At this time, a scattering absorption cross-section, constants of upper order life, etc. which are required for calculation are obtained by measuring absorption spectrum or fluorescent spectrum of an amplifying optical fiber.

When a signal light is amplified by using an amplifying fiber which is set to be optimized in its length or concentration of amplifying active elements, amplification of spontaneous emission (ASE) occurs. In general, it is known that a relation between an intensity of ASE generated at the time of amplification and a gain changes dependently on operating condition of an optical amplifier.

Figure 2:
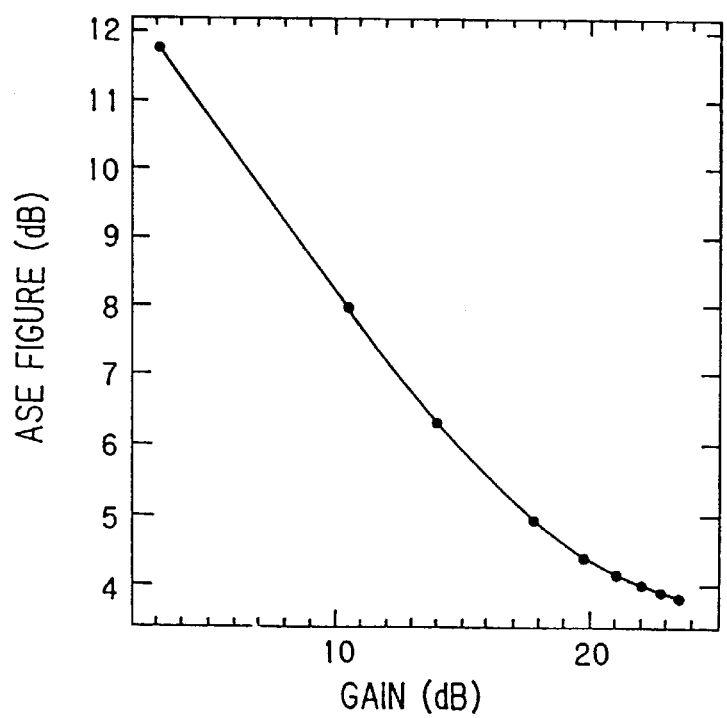
FIG. 2 is a graph explaining amplification of spontaneous emission (ASE) relative to amplification factor.

FIG. 2 shows one example of a relation between an ASE figure and a gain, wherein the figure is not constant relative to the gain. In the invention, the relation was studied in detail, and it was found that an intensity of ASE is not changed, even if an intensity of an input signal light is changed, when a gain is constant.

Figure 3:
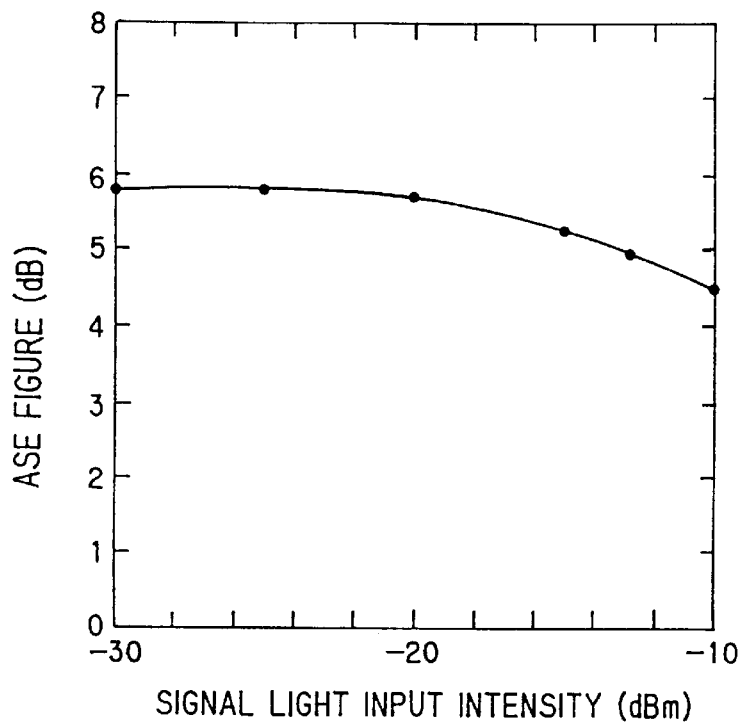
FIG. 3 is a graph explaining ASE relative to signal light input intensity.

FIG. 3 shows a relation between an ASE figure and an intensity of an input signal light. In the invention, a gain of a signal light is detected by detecting an intensity of an ASE. It is important that an intensity of an ASE is constant independently of a signal light intensity, when a gain is constant. Further, it was found that wavelength-dependency of a gain is determined without influence of an input signal light by a gain, when a length of an optical fiber is constant.

Figure 4:
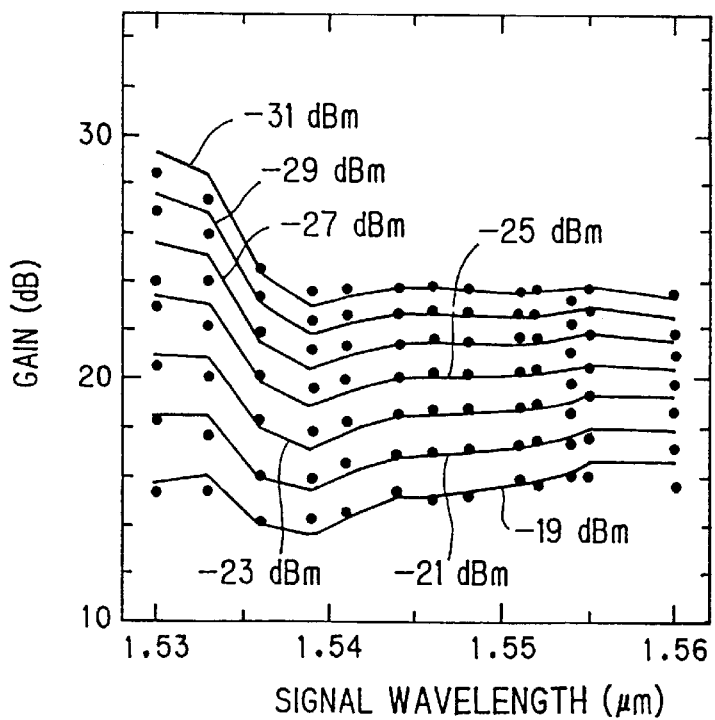
FIG. 4 is a graph explaining gain dependent on wavelength in accordance with the change of input signal intensity.

FIG. 4 shows wavelength-dependency of a gain, when a signal light intensity is changed to be −19, −21, −23, −25, −27, −29 and −31 dBm as indicated therein, and an excitation light intensity is constant to be 28.5 mW.

Figure 5:
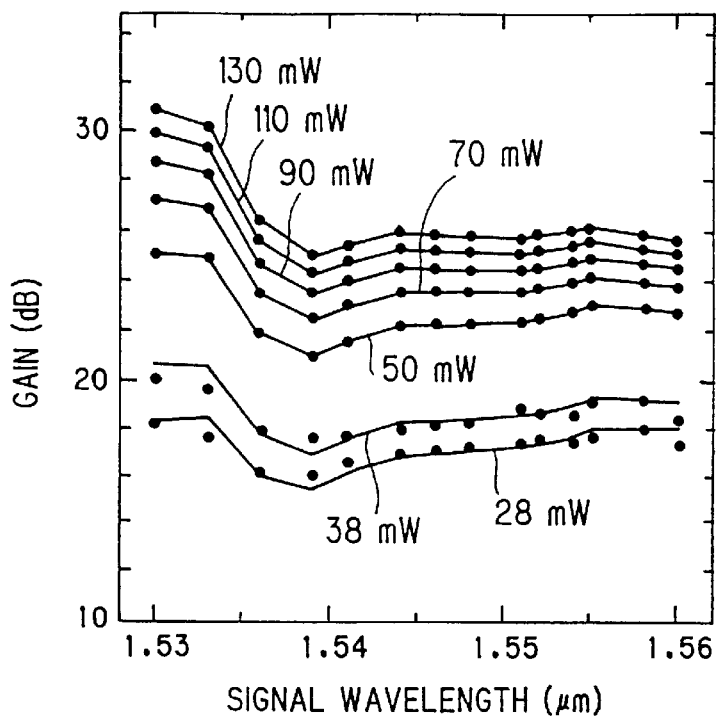
FIG. 5 is a graph explaining gain dependent on wavelength in accordance with the change of excitation light intensity.

FIG. 5 shows wavelength-dependency of a gain, when an excitation light intensity is changed to be 28, 38, 50, 70, 90, 110 and 130 mW, and an input signal light intensity is constant to be −21 dBm per one channel.

In experiments to collect data as shown in FIGS. 4 and 5, the gain of the signal light is changed in different manners. Even in such cases, two wavelength-dependencies are the same as each other, when the gains are the same. It is important that an amplifying optical fiber expresses a constant wavelength-dependency of a gain without influence of a signal light intensity, when a gain is constant.

An intensity of a detected ASE is compared with a predetermined intensity to provide a predetermined wavelength-dependency of a gain, and a light emission amount of an excitation light source is adjusted by a difference between the intensities of the detected ASE and the predetermined value.

When it is required that an intensity of an output signal light or a gain of an optical amplifier can be changed, a variable attenuator is provided at an input or output of the optical amplifier.

When it is required that no ASE exists at a wavelength range in which no signal light exists, for instance, in case where a multiple-step repeating system using optical amplifiers is structured, the ASE is effectively removed by providing an optical filter having an appropriate wavelength-dependency in the multiple-step repeating system.

Figure 6:
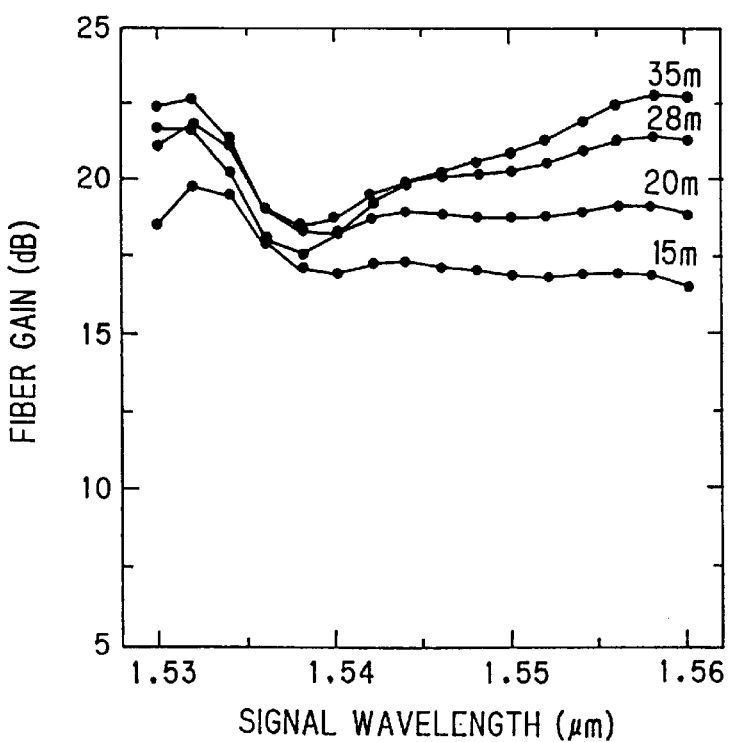
FIG. 6 is a graph explaining fiber gain relative to signal wavelength.

FIG. 6 shows a gain of sixteen signal light having wavelengths each different from an adjacent one by 0.002 μm in a range of 1.53 μm to 1.56 μm, when a length of an EDFA is changed to be 15, 20, 28 and 35 m as indicated therein. In this case, it is assumed that a predetermined gain is 20 dB for the signal lights of the sixteen channels. An amplifying optical fiber comprises a core doped with 800 ppm of Erbium for an active element, and an excitation light source comprises a semiconductor laser emitting a light of 0.98 μm band.

As understood from FIG. 6, when the EDF is optimized to be 28 m, the wavelength-dependency of a gain are relatively flat to provide only a difference of 4 dB between the maximum and minimum gains as compared to the other EDFS of 15, 20 and 35 m.

Figure 7:
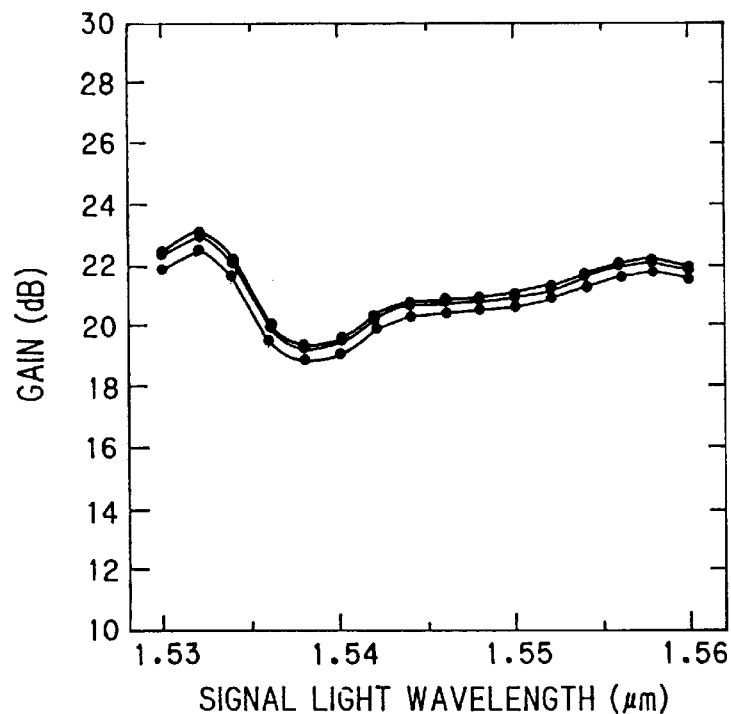
FIG. 7 is a graph explaining gain relative to signal light wavelength.

FIG. 7 shows the wavelength-dependency of a gain, when the EDF is set to be 28 m for the optimized length, and an intensity of an input signal light is changed. In this case, an input power of an excitation light source is controlled to provide a constant mean gain for each signal light. As clearly shown therein, when the mean gain is constant, the wavelength-dependency of a gain is constant without dependency on intensities of input signal lights.

Figure 8:
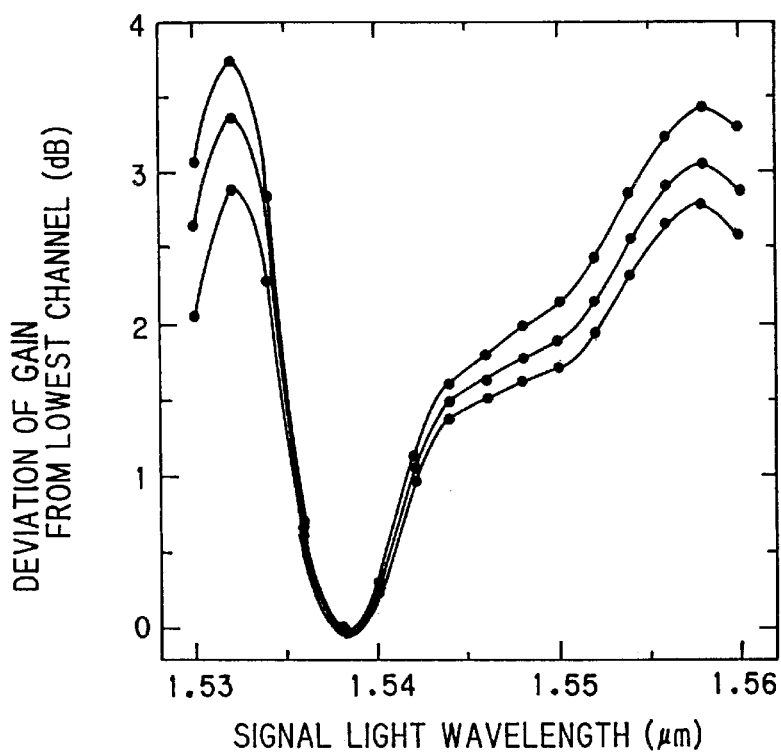
FIG. 8 is a graph explaining deviation of gain from lowest channel relative to signal light wavelength.

FIG. 8 shows the wavelength-dependency of a gain, when an input signal light is constant in intensity to be supplied to an amplifying optical fiber of 28 m, and the gain of the signal light is changed by adjusting an excitation light power supplied from an excitation light source. An intensity of the input signal light is fixed to be −20 dBm for each channel, an a mean gain is changed by changing the excitation light to be 30 mW, 40 mW and 50 mW. Apparently, the wavelength-dependency of a gain is changed by changing the mean gain of the signal light, even in case where the optical fiber length is constant. For this reason, it is effective in keeping the wavelength-dependency constant to keep the mean gain constant.

Next, it will be described that the wavelength-dependency of a gain which is made flat by setting an optical fiber length to be optimized does not depend on a power of an input signal light. When plural signal lights of different wavelengths are simultaneously amplified by using an optical amplifier, it is not always that all wavelength channels are supplied thereto with the same input power. It is evident to be advantageous for an optical amplifier that, even if a signal input power of a wavelength channel is changed, the same gain is maintained for the other channels to be amplified simultaneously. This is because, if the gains of the other channels are changed in case where a signal input power of a wavelength channel is changed, intensity modulation occurs for the other wavelength channels in accordance with the change of the signal input power. In such a case, good signal transmission is not expected.

As described above, it was first found in the invention the wavelength-dependency of a gain in an optical amplifier using an amplifying optical fiber is determined by an optical fiber length and a mean gain. Accordingly, a gain of each wavelength channel is not effected from an input signal light intensity of each wavelength channel by controlling a mean gain to be constant. Thus, an optical amplifier for carrying out stable simultaneous amplification of wavelength multiplexing signal lights is provided in the invention.

Figure 9:
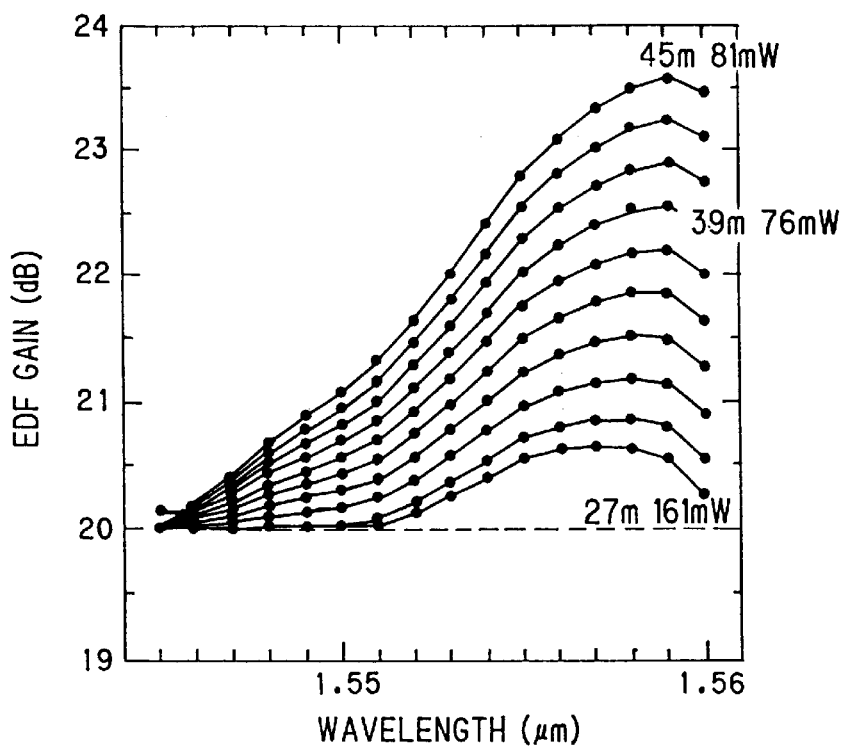
FIG. 9 is a graph explaining dependent on wavelength.

FIG. 9 shows a relation between EDF gain and wavelength, wherein an optical fiber length and an output of anexcitation light for providing 20 dB at the lowest channel are indicated, and sixteen signal lights each having a different wavelength of 0.001 μm from an adjacent wavelength channel in a range 1.545 μm to 1.560 μm. In this case, it is set that a predetermined wavelength-dependency of a gain provides a gain difference of less than 3 dB between the maximum and minimum channels. An amplifying optical fiber comprises a core doped with 800 ppm of Erbium as an active element, and an excitation light source comprises a semiconductor laser emitting light of a 1.48 μm band. In this case, the wavelength-dependency of a gain which is flattest is obtained, when a length of an amplifying optical fiber is 27 m. However, a required output of an excitation light is 161 mW which is too high for industrial purpose.

Figure 10:
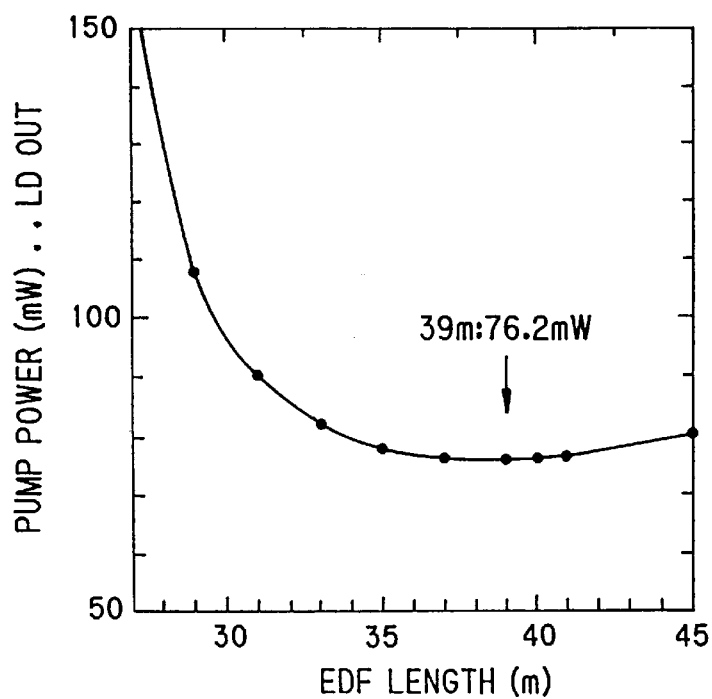
FIG. 10 is a graph explaining excitation light output (pump power) relative to EDFA length.

FIG. 10 shows a relation between an output of an excitation light and a length of an EDF in case where the minimum gain is obtained to be 20 dB. It is shown that a required output of the excitation light is minimum to be 76.2 mW, when the length is 39 m.

In the invention, the wavelength-dependency of a gain is set to be best by optimizing a fiber length. In the modification of the invention, when a gain meets a predetermined standard (for instance, a gain difference of less than 3 dB between the maximum and minimum channels), a required output of an excitation light which is lowest in the predetermined standard may be sought.

Figure 11:
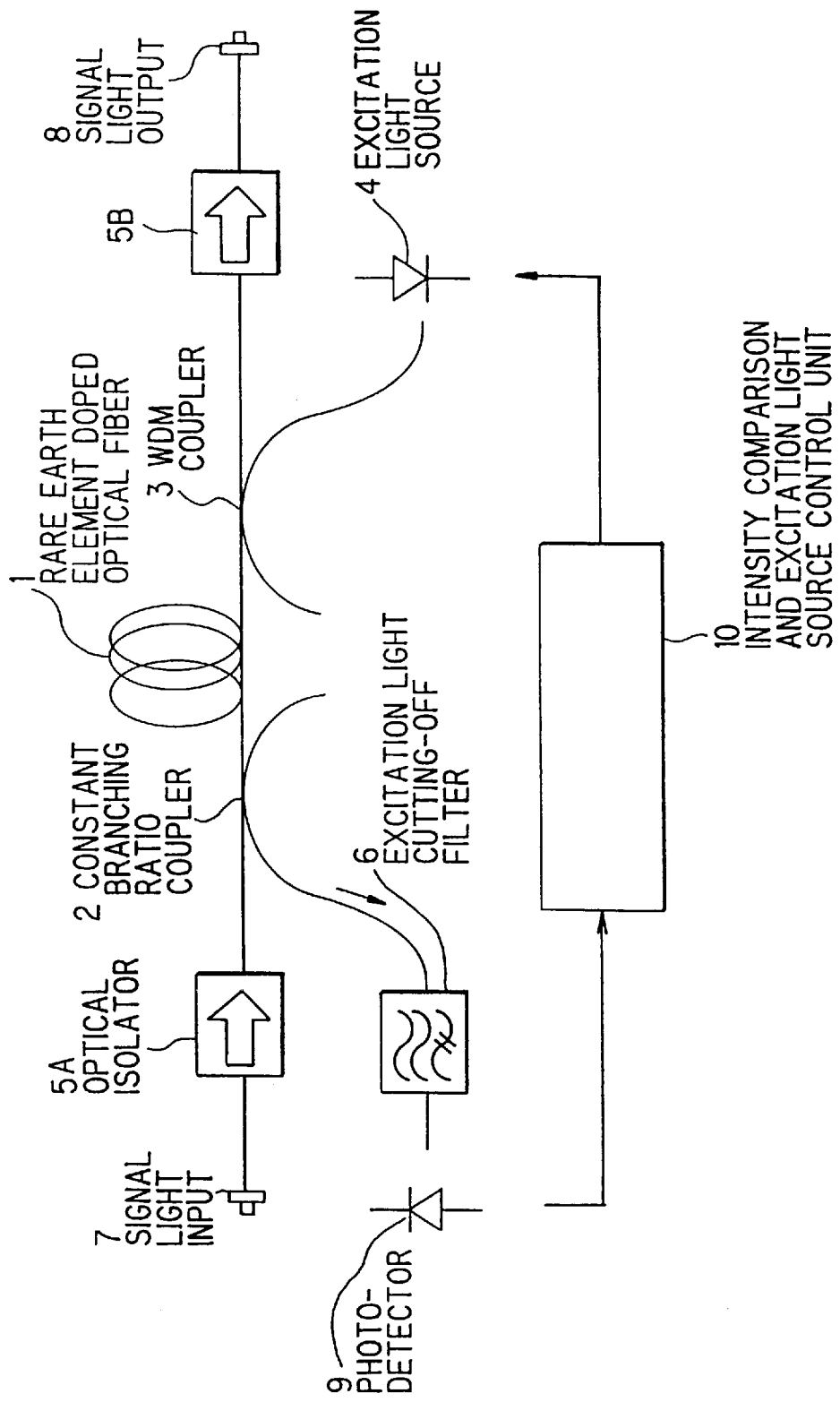
FIG. 11 is a block diagram showing an optical amplifier in a first preferred embodiment according to the invention.

FIG. 11 shows an optical amplifier in the first preferred embodiment according to the invention.

The optical amplifier comprises an Erbium-doped optical fiber(EDF) 1, a constant branching ratio coupler 2, a WDM coupler 3, an excitation light source 4 comprising a semiconductor laser of a 1.48 μm band, optical isolators 5A and 5B, an excitation light cutting-off filter 6, a signal light input 7, a signal light output 8, an PIN photodetector 9, and an intensity comparison and excitation light source control unit 10.

In operation, a signal light supplied to the input 7 is supplied via the coupler 2 to the EDF 1, in which the signal light is amplified. The excitation light is supplied from the excitation light source 4 via the WDM coupler 3 to the EDF 1 in the opposite direction. An ASE generated in the EDF 1 is supplied via the coupler 2 and the excitation light cutting-off filter 6 to the photodetector 9. The optical isolators 5A and 5B which is provided on the input and output sides of the EDF 1 prevent oscillation and noise light from increasing at the time of amplification. An intensity of the ASE detected in the photodetector 9 is supplied to the intensity comparison and excitation light source control unit 10, in which the ASE intensity is compared with a predetermined intensity to generate a difference signal, and from which the excitation light source is controlled in accordance with the difference signal.

Figure 12:
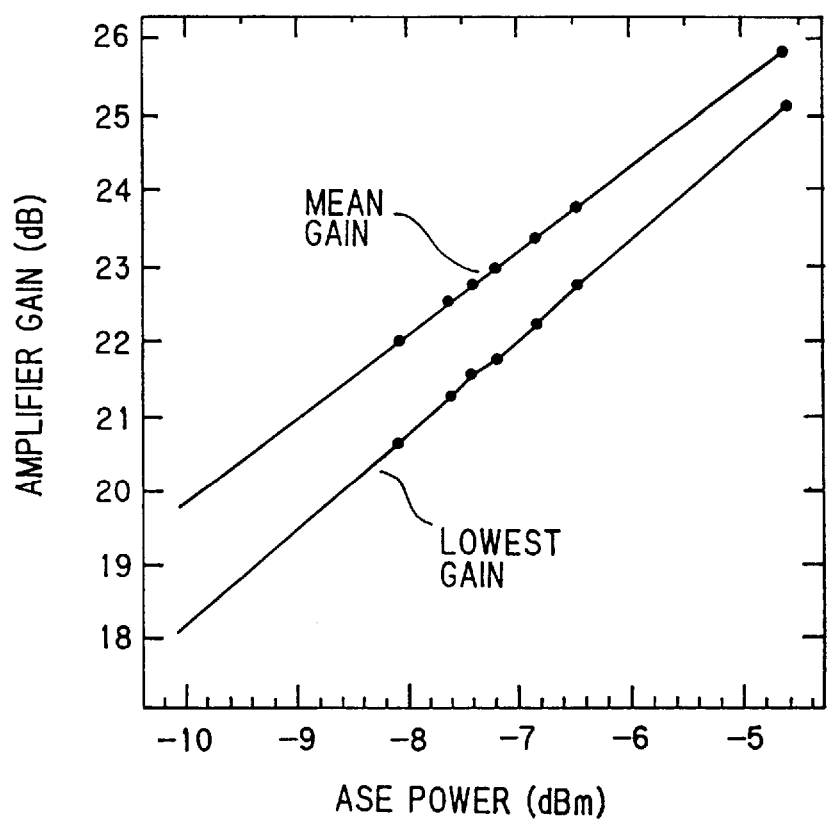
FIG. 12 is a graph explaining gain relative to ASE.

FIG. 12 shows a relation between a mean gain of sixteen signal lights ranging with a 1 μm wavelength interval from 1.545 μm and an ASE power. The lowest gain is also indicated therein. The relation is obtained in the optical amplifier as shown in FIG. 11, wherein the EDF comprises a core doped with 800 ppm of Erbium, and has a length of 39 m to lower a required excitation light output. As apparent from the relation, a gain can be detected by detecting an ASE power. Therefore, it is not necessary that an intensity of an input signal light, the number of input signal lights, and an intensity of an excitation light are detected.

Figure 13:
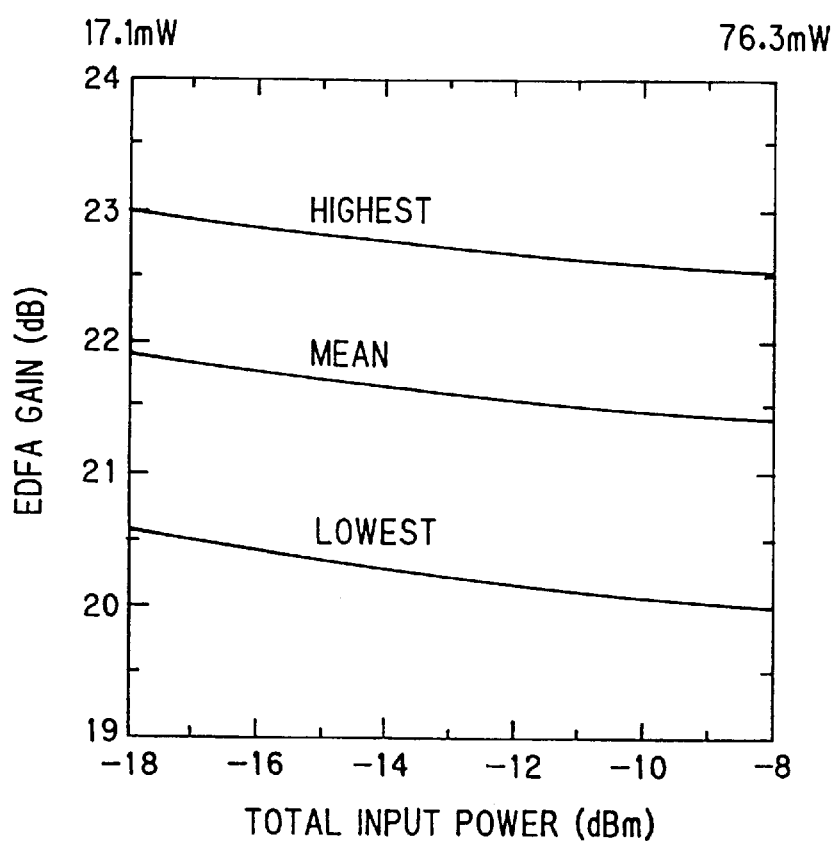
FIG. 13 is a graph explaining EDFA gain relative to total input power.

FIG. 13 shows a relation between an EDFA gain and a total input power in the optical amplifier as shown in FIG. 11. The relation verifies that the wavelength-dependency of a gain does not depend on a power of input signal lights by controlling a power of the ASE to be constant. In order to change a power of the input signal light, intensities of sixteen signal lights are simultaneously changed, or one or some of the sixteen signal lights are turned off. Apparently, the wavelength-dependency of a gain does not change substantially by controlling the mean gain to be constant.

Figure 14:
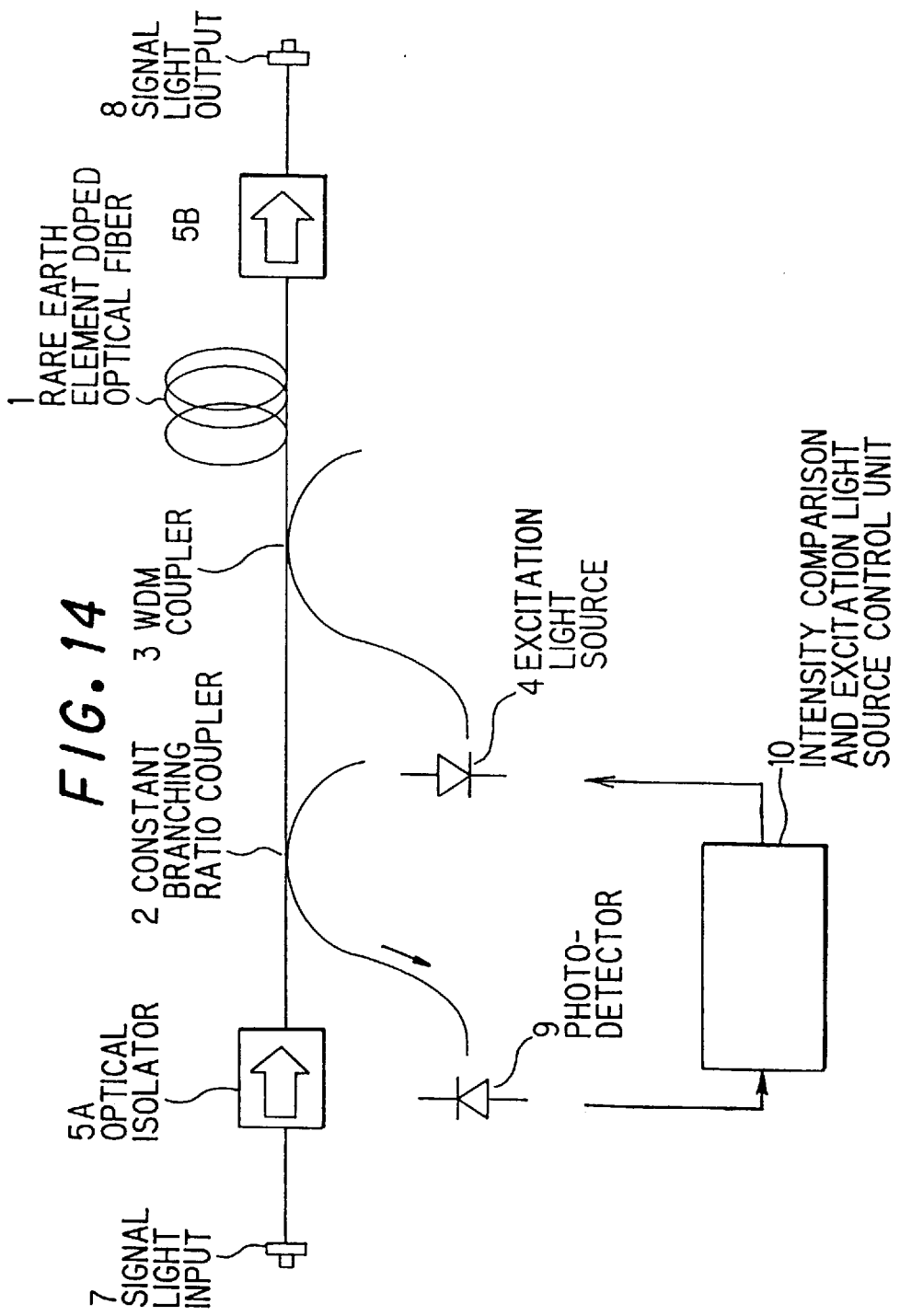
FIGS. 14 to 19 are block diagrams showing optical amplifier in second to seventh preferred embodiments according to the invention.

FIG. 14 shows an optical amplifier in the second preferred embodiment according to the invention, wherein like parts are indicated by like reference numerals as used in FIG. 11.

In the second preferred embodiment, the excitation light cutting-off filter 6 is not necessary to be provided, because an excitation light supplied from the excitation light source 4 is supplied via the coupler 3 to the EDF, in the same direction as the signal light, and the same result as the first preferred embodiment is realized.

Figure 15:
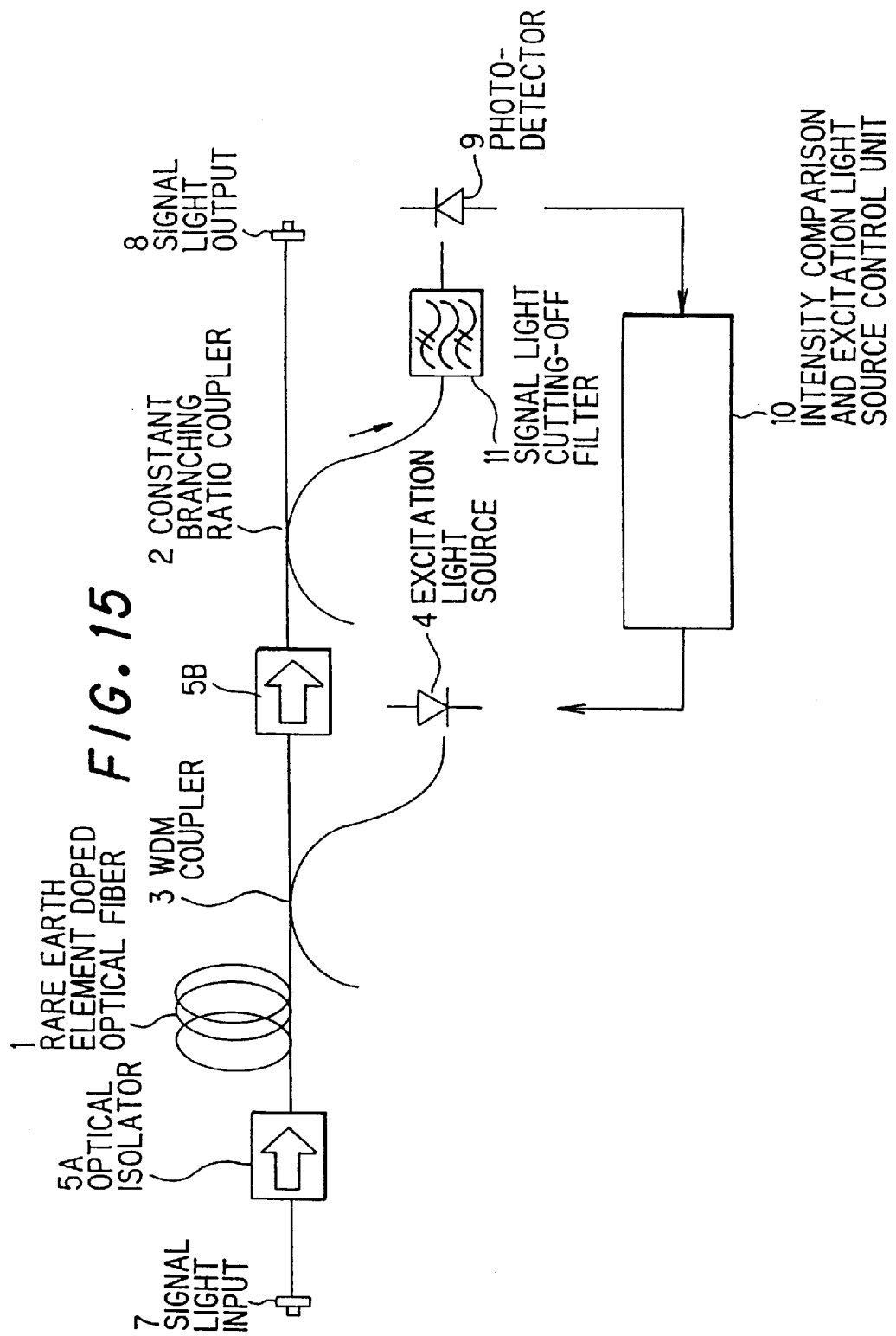

FIG. 15 shows an optical amplifier in the third preferred embodiment according to the invention, wherein like parts are indicated by like reference numerals as used in FIG. 11.

In the third preferred embodiment, an excitation light is supplied via the coupler 3 to the EDF 1 in the opposite direction to the signal light by the excitation light source 4, and the ASE is sampled via the coupler 2 and a filter 11 for stopping the signal light to be supplied to the photodetector 9.

Figure 16:
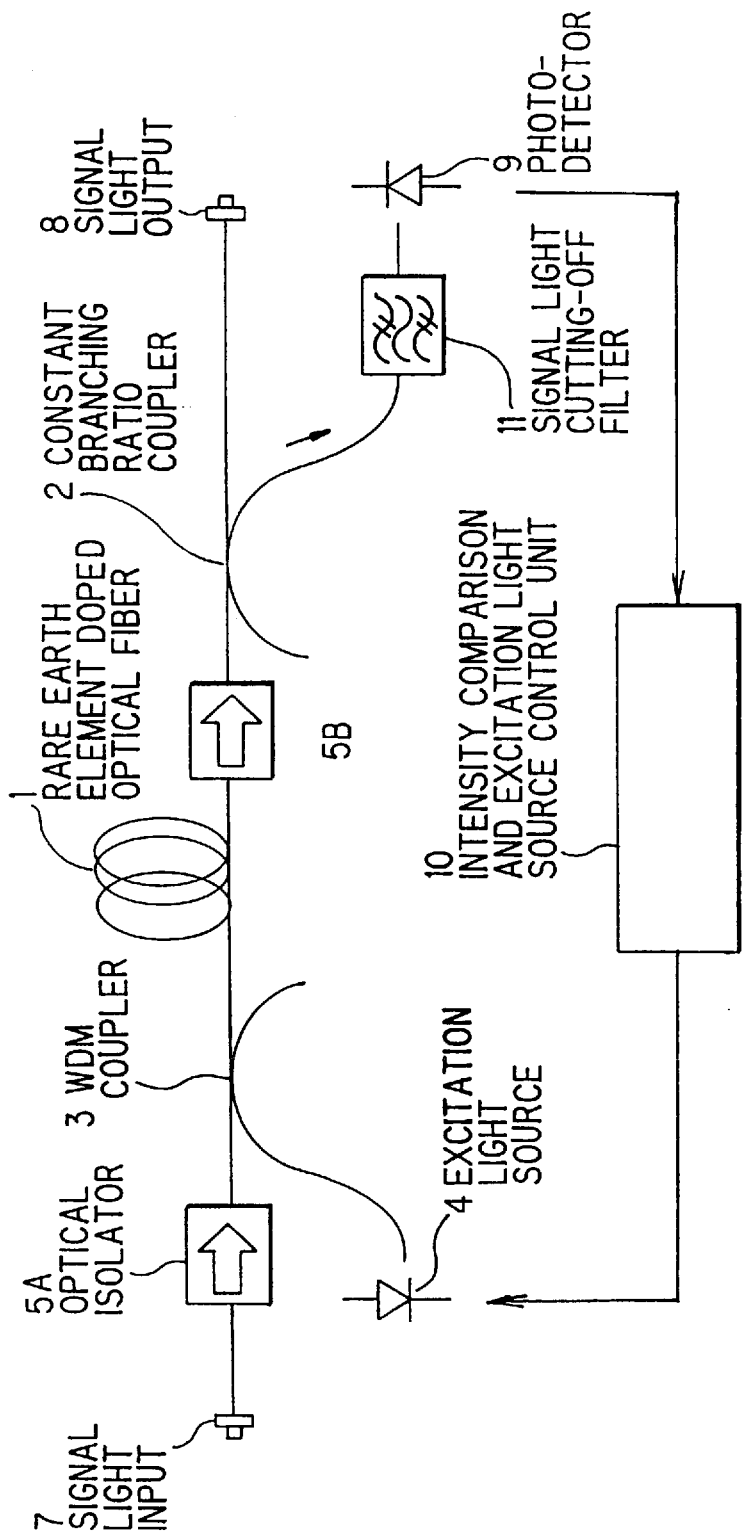

FIG. 16 shows an optical amplifier in the fourth preferred embodiment according to the invention, wherein like parts are indicated by like reference numerals as used in FIG. 11.

In the fourth preferred embodiment, an excitation light is supplied via the coupler to the EDF 1 in the same direction as the signal light by the excitation light source 4, and the ASE is supplied via the coupler 2 and the signal light cutting-off filter 11 to the photodetector 9.

Figure 17:
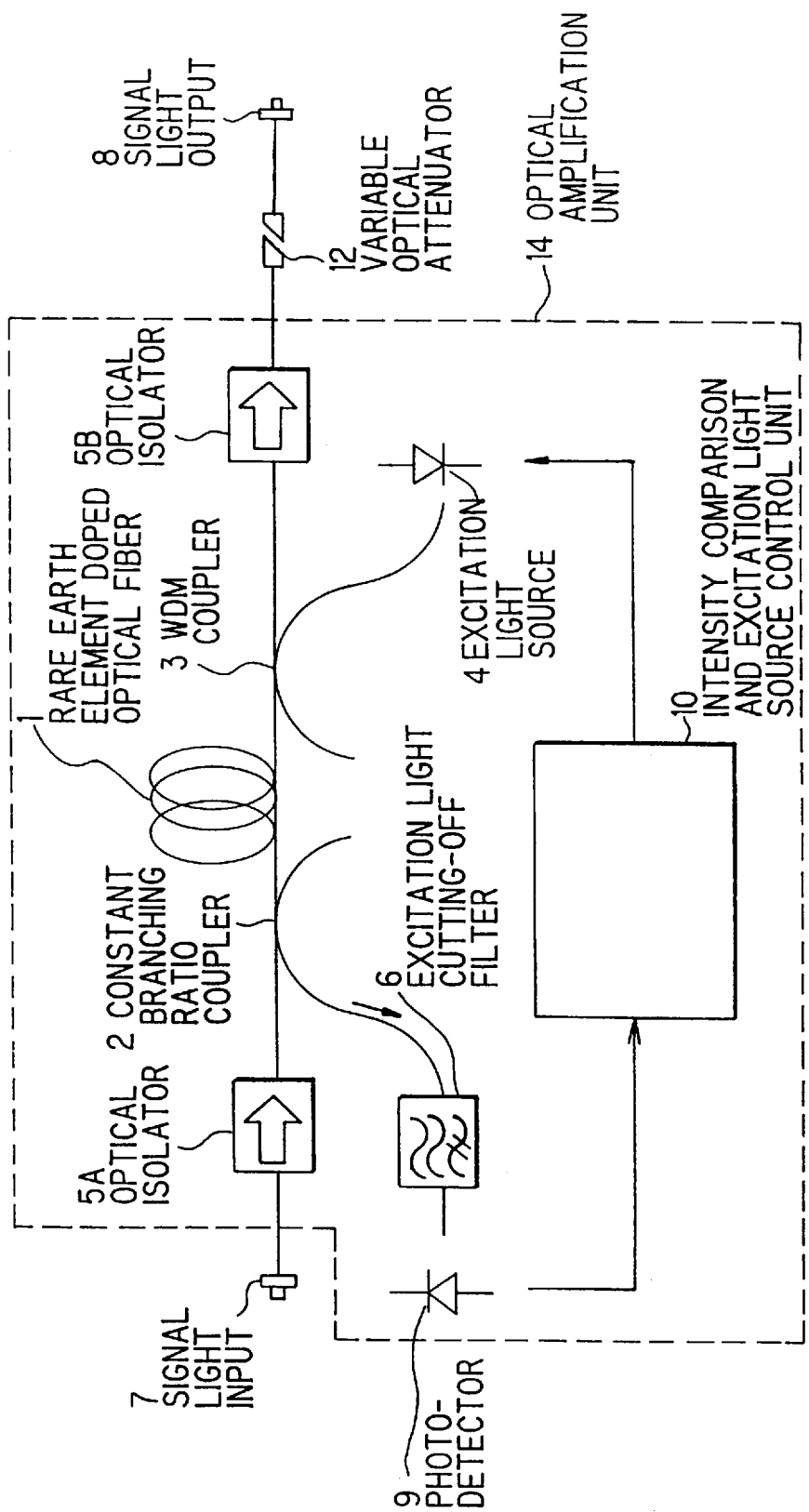

FIG. 17 shows an optical amplifier in the fifth preferred embodiment according to the invention, wherein like parts are indicated by like reference numerals as used in FIG. 11.

In the fifth preferred embodiment, the reference numeral 14 indicates an optical amplifier unit which is the same as the optical amplifier as shown in FIG. 11, and may be replaced by one of the optical amplifiers in FIGS. 14 to 16, and the reference numeral 12 indicates a variable optical attenuator to vary a gain without changing the wavelength-dependency of the gain. Thus, an arbitrary intensity of a signal light is obtained at the output 8. The variable optical attenuator 12 having no wavelength-dependency is easily available in the state of the art.

Figure 18:
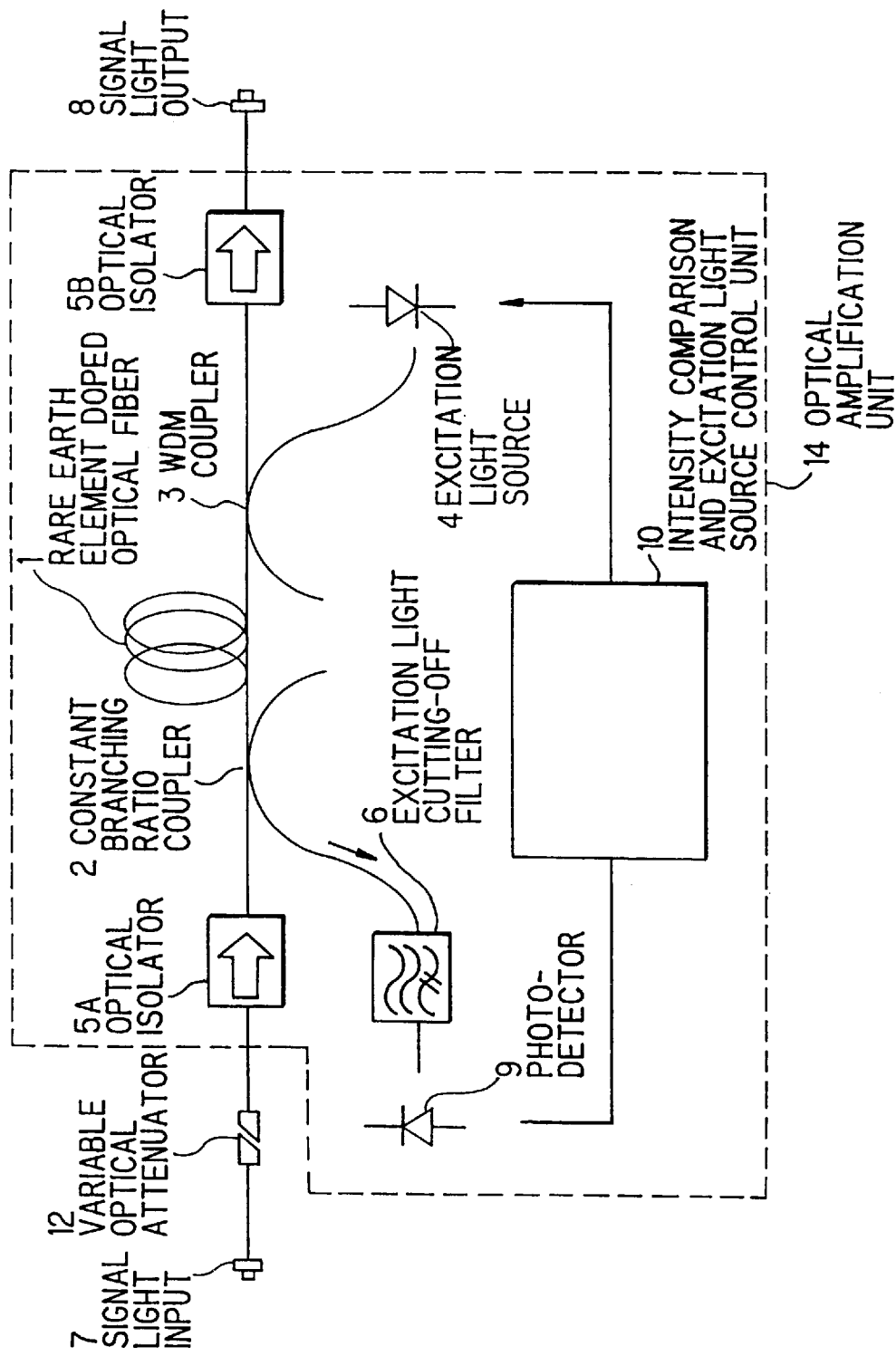

FIG. 18 shows an optical amplifier in the sixth preferred embodiment according to the invention, wherein like parts are indicated by like reference numerals as used in FIG. 17.

In the sixth preferred embodiment, the variable optical attenuator 12 is positioned on the input side of the optical amplifier unit 14. For this structure, when a gain to be required is small, an output power of the excitation light source 4 can be decreased as compared to that in FIG. 17.

Figure 19:
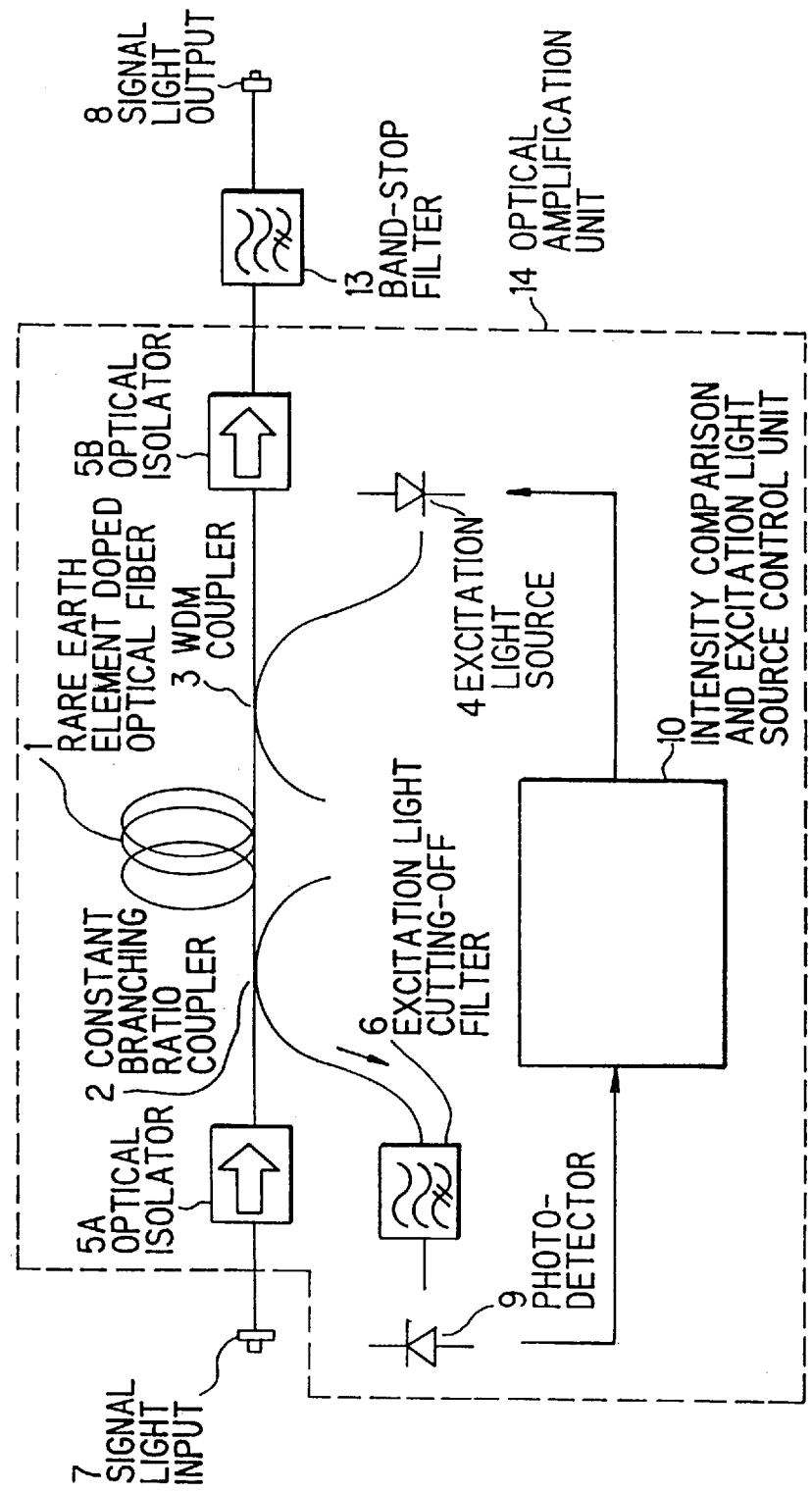

FIG. 19 shows an optical amplifier in the seventh preferred embodiment according to the invention, wherein like parts are indicated by like reference numerals as used in FIGS. 17 and 18.

In the seventh preferred embodiment, a band-stop filter 13 for attenuating stopping an ASE of a wavelength band having no signal light is provided between the optical amplifier unit 14 and the output 8. The band-stop filter 13 may be replaced by a long wavelength-pass filter, a band-pass filter, a short wavelength-pass filter, etc. The band-stop filter 13 may be positioned on the input side of the optical amplifier unit 14, or an each of optical fibers connecting optical amplifier units to provide a multiple-stage repeating system.

In the seventh preferred embodiment, four signal light ranging with a 3 nm interval from 1.548 $\mu$m to 1.557 $\mu$m are amplified with improved wavelength-flatness by 10 dB, and the EDF 1 has a length of 10 m to include a core doped with 800 ppm of Erbium as an active element.

Figure 20:
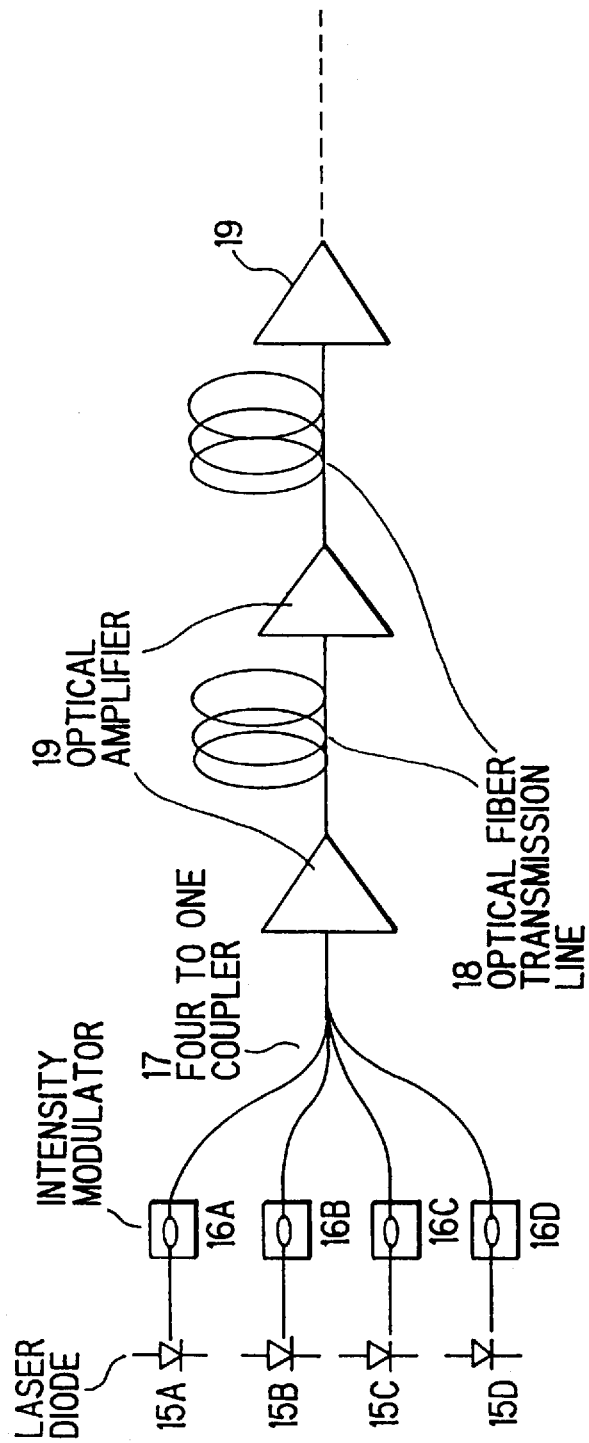
FIG. 20 is a graph explaining signal ASE relative to wavelength in the preferred embodiments.

FIG. 20 shows the intensities of the four signal lights indicated by $S_1$, $S_2$, $S_3$ and $S_4$, and ASE relative to wavelength obtained in the repeating system having 45 stages of the optical amplifiers 19 each comprising the band-stop filter 13 as shown in FIGS. 19 and 20.

As clearly shown therein, an improved S/N ratio is obtained by stopping the ASE, especially an ASE generated in the vicinity of 1.53 $\mu$m. Unless the band-stop filter 13 is provided, the ASE is amplified in each optical amplifier 19 to hinder better signal transmission.

In practical use, the optical filter transmission lines 18 are different in attenuation. Even in such a case, the attenuators 12 set input and output signal lights to be desired intensities.

Figure 21:
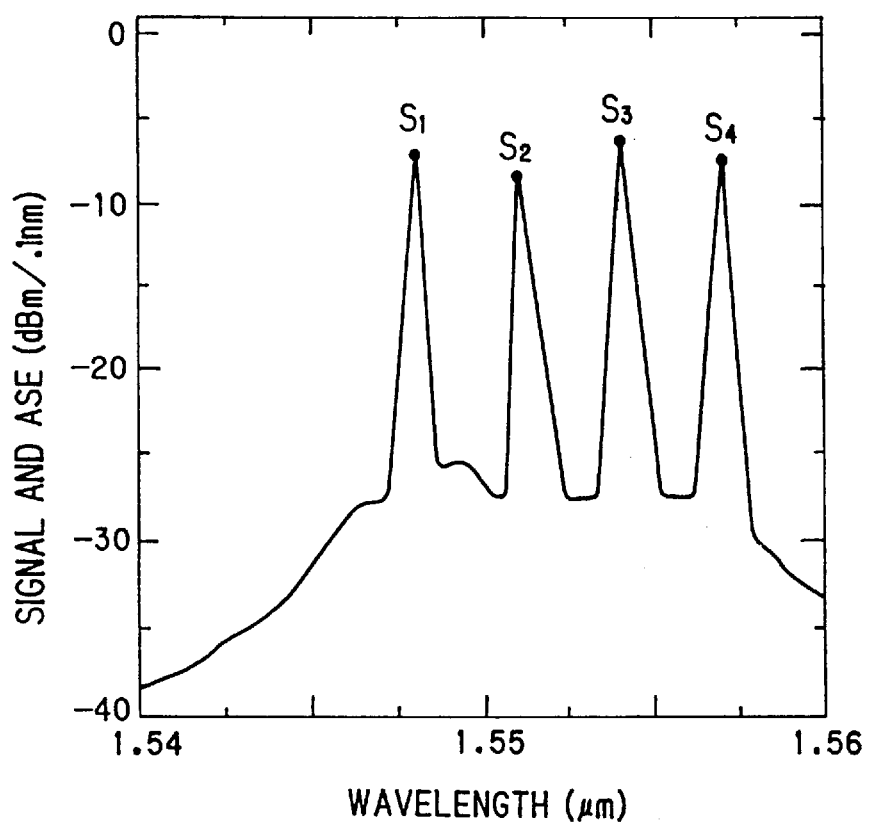
FIG. 21 is a block diagram showing an optical transmission system in which four signal lights are simultaneously repeated to be transmitted.

FIG. 21 shows a multiple-stage repeating system which comprises laser-diodes 15A, 15B, 15C and 15D emitting signal lights of wavelengths 1.548 $\mu$m, 1.551 $\mu$m, 1.554 $\mu$m and 1.557 $\mu$m, intensity modulators 16A, 16B, 16C and 16D modulating intensities of the four signal lights, a four-to-one coupler 17 for coupling the four signal lights, optical amplifiers 19 each being one as explained in the first to seventh embodiments, and optical fiber transmission lines 18 connecting the optical amplifiers 19.

In the multiple-stage repeating system, each of the optical fiber transmission lines 18 has a length of approximately 45 km providing an attenuation of 10 dB for the signal lights, and the attenuated signal lights are amplified to be a predetermined intensity.

As a matter of course, the invention can be applied to an analog light transmission, in which composite secondary distortion is reported to occur in accordance with the amplification in the optical amplifiers of signal lights having expanded wavelength-bands. In the invention, the signal light of the expanded wavelength-bands are considered to be combination of signal light having slightly different wavelengths. Therefore, the invention can be applied to the analog light transmission without any change.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching here is set forth.

What is claimed is:

1. An optical transmission system, comprising:
    a light source emitting plural signal lights of different wavelengths;
    an optical modulator modulating said plural signal light to provide plural modulated signal lights;
    an optical coupler coupling said plural modulated signal lights to provide as an output a wavelength division multiplexed (WDM) transmission signal light;
    one or more amplifying optical fibers having a mean gain, being supplied with said WDM transmission signal light and an amount of excitation light, and providing an amplified WDM transmission signal light as an output; and a control unit controlling said amount of excitation light, in accordance with an amplification of spontaneous emission expressing a gain of said WDM transmission signal light, to achieve a predetermined gain for said one or more amplifying optical fibers;

wherein said predetermined gain is a gain value at which dependency of said mean gain on wavelengths of said WDM transmission light signal is substantially minimized.

2. An optical transmission system according to claim 1, further comprising an attenuator attenuating one of:

said WDM transmission signal light provided to said one or more amplifying optical fibers; and said amplified WDM transmission signal light.

3. An optical transmission system according to claim 1, further comprising a filter removing an amplification of spontaneous emission at a wavelength which is not one of said different wavelengths of said plural signal lights.

* * * * *